Sept. 6, 1966  J. P. MARBACH  3,270,548
CALIBRATING SYSTEM FOR PROPORTIONING SYRINGE
Filed July 20, 1964
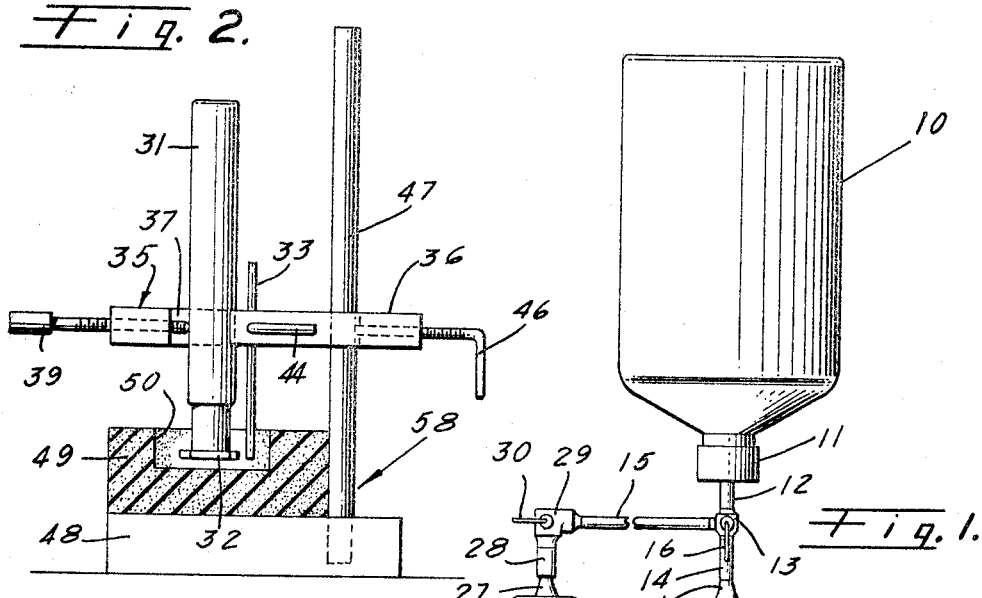
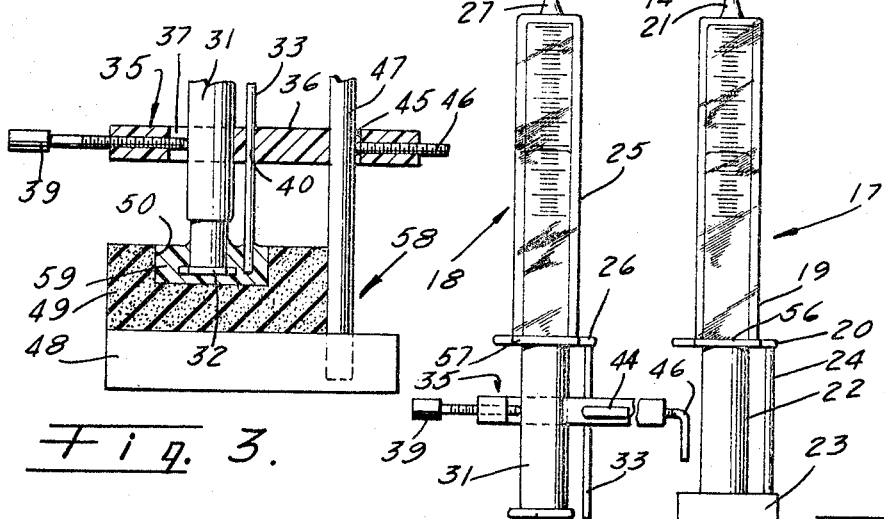
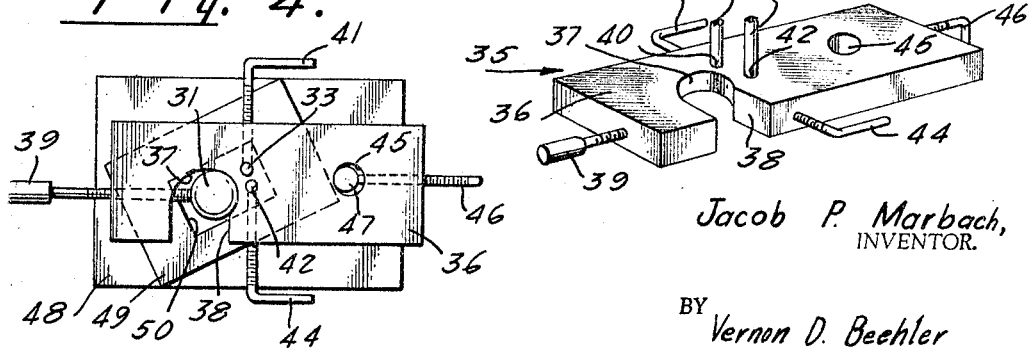
Jacob P. Marbach,
INVENTOR.
BY Vernon D. Beehler
Attorney United States Patent Office 3,270,548
Patented Sept. 6, 1966

3,270,548
CALIBRATING SYSTEM FOR PROPORTIONING SYRINGE
Jacob P. Marbach, 17736 Kinzie St., Northridge, Calif.
Filed July 20, 1964, Ser. No. 383,842
6 Claims. (Cl. 73—1)

The invention relates to laboratory apparatus and has special reference to a system and method for calibrating proportioning and sampling syringes in order to be able to make ready many working syringes all capable of automatically sampling liquids to be tested at precisely the same volumes.

Although the expedient of presetting the sampling volume of syringes has been known and practiced in laboratory analysis, the systems heretofor available for determining the volume have been quite inadequate. The most common expedient has been a cut and try expedient where alternately greater and lesser quantities of liquid are tried in a device and averaged out until the best available average is achieved. On other occasions the working syringe itself is provided with an adjustable metering stick which is adjusted with a test fluid until the particular working syringe in question is set to measure a desired quantity of liquid. The last mentioned method is quite time consuming, is not completely accurate except in the hands of skilled technicians, and requires a separate independent adjustment for each working syringe in turn. On those occasions where the working syringe is calibrated to a master of some kind, there has not been heretofor devised a simple, easy and direct means of using the master successively for a large number of individual working syringe adjustments.

It is therefore among the objects of the invention to provide a new and improved system and method for calibrating a plunger type syringe.

Another object of the invention is to provide a new and improved method and system, and accompanying apparatus, by means of which virtually any number of working syringes, whether used for sampling, proportioning, measuring or otherwise, can be accurately calibrated to precisely correspond with each other.

Still another object of the invention is to provide a new and improved method and system, together with the necessary equipment, by means of which a working syringe can be quickly and accurately calibrated without need for employing technicians of exceptional skill and ability, the method, system and apparatus being such that the working syringe can be calibrated for more than one predetermined volume but with the same degree of speed, accuracy and dependability as is possible when calibrated for but a single volume.

Still another object of the invention is to provide a new and improved method and system for calibrating working syringes which is extremely simple to operate, which needs only simple and inexpensive equipment, and which can be repeated innumerable times with precisely the same results by persons of only moderate technical skill.

With these and other objects in view, the invention consists in the construction, arrangement and combination of the various parts of the device, whereby the objects contemplated are attained, as hereinafter set forth, pointed out in the appended claims, and illustrated in the accompanying drawings.

FIGURE 1 is a side elevational view of a typical apparatus made use of in the employment of the method and system.

FIGURE 2 is a side elevational view of another of the pieces of equipment usable in the practice of the method and system with a portion in section.

FIGURE 3 is a side elevational view, somewhat similar to FIGURE 2, but showing more of the apparatus in section and with the method having progressed to the final step.

FIGURE 4 is a plan view of the apparatus of FIGURES 2 and 3.

FIGURE 5 is a side perspective view of the jig made use of in the method and system in making the transfer of calibrating equipment from the step of FIGURE 1 to the step of FIGURE 2.

In the embodiment of the invention which is primarily for illustrative purposes in describing how the method and system is carried out, there is shown a reservoir tank 10 which is adapted to contain a quantity of liquid useful in the calibrating system. Such a liquid can be distilled water or virtually any relatively non-volatile liquid, the specific gravity of which is comparable to that of liquids which the working syringe will ultimately be used with. At the bottom of the reservoir tank is a fitting 11 from which extends a nipple 12. At the end of the nipple is a three-way valve 13, at the lower end of which is a second nipple 14 and from one side of which extends a pipe 15. A handle 16 is employed to turn the three-way valve in one direction or another.

Attached to the nipple 14 is a master syringe, indicated generally by the reference character 17. A working syringe, indicated generally by the reference character 18, is the syringe which is to be calibrated in accordance with the setting of the master syringe.

More particularly, the master syringe consists of a barrel 19 having on it a flange 20, at the lower end as pictured in FIGURE 1, and at the upper end of which an extension 21 adapted to be releasably engaged with the nipple 14. A plunger 22 is adapted to slide into the barrel 19 and is designed to be manipulated by means of a handle 23. A rod 24, also fastened to the handle, cooperates with the flange 20, and the length of the rod determines the degree to which the barrel will be filled with a calibrating liquid during a calibrating operation.

The working syringe is of similar construction and consists of a barrel 25 having a flange 26 thereon, and at the upper end of which is an extension 27 adapted to releasably engage a nipple 28 which extends downwardly from a shut off valve 29 operated by a handle 30. A plunger 31 is adapted to slide into the barrel 25 and has at its outer or lower end a collar 32. A rod 33 serves a purpose similar to the rod 24 when ultimately assembled with the plunger in accordance with the calibrating method and system.

For holding the plunger 31 and rod 33 during the practice of the method and system, use is made of a jig, indicated in general by the reference character 35 and consisting in the main of the block 36, shown in perspective view in FIGURE 5. In the jig is a relatively large bore 37 adapted to accommodate the plunger 31 and from which extends a slot 38 so that the plunger can be slipped into position. A tightening thumb screw 39 threadedly engages material of the block 36, extending into the bore 37 where it can engage the plunger 31.

A smaller bore 40, lying closely adjacent the bore 37, is adapted to slidably accommodate the rod 33. A tightening screw 41 threadedly engages the material of the block 36 and extends into the bore 40 so as to be capable of holding the rod 33 in a selected position during practice of the method and employment of the system. If desired there may be included a second smaller bore 42 for use with a second rod 43 which can be held in a selected position in the bore by employment of a tightening screw 44.

Still another bore, which, in the embodiment shown, is of intermediate diameter accommodates a stanchion 47. A tightening screw 46, also threadedly engaging the block 36, is adapted to enter the bore 45 so that when the stanchion 47 extends through the bore 45, as indicated in FIGURES 2 and 3, the screw 46 can engage the stanchion and thereby hold the block 46 in a selected position of elevation. The balance of the apparatus consists of a base 48 in which the stanchion 47 is vertically supported. Upon the base is a mold block 49 in which is a mold cup or recess 50 having the shape, size and proportions suited to forming a handle upon the plunger 31.

In the employment of the method and system, a quantity of calibrating liquid of some selected kind is placed in the reservoir tank 10. How much liquid is placed in the tank is of secondary importance except that it should be of volume in excess of what might be needed to fill the barrel 19 of the master syringe 17 plus an adequate overage in order that there may be always a head of liquid in the system. The master syringe 17 is fastened then to the nipple 14, and the working or proportioning syringe 18 is fastened to the nipple 28. The shut-off valve 29 is opened to clear passage from the pipe 15 through the valve to the nipple 28. The two way valve 13 is adjusted by employment of its handle 16 so that a passageway is created from the tank 10 through the nipples 12 and 13 to the barrel 19.

It should be understood, however, that before the master syringe is made use of in the method and system, it is calibrated to a predetermined volume by weighing to the nearest 0.1 mg. the amount of liquid, as for example distilled water, which it discharges. In this way, the calibrating syringe is established as a master. In establishing the volume, the rod 24 is adjusted with respect to a handle 55 so that when the upper end of the rod is in engagement with the flange 20, the desired volume of liquid will fill the end of the barrel at the opposite end from which the plunger enters the barrel. If desired, several master syringes may be established set for different calibrating amounts and this is especially necessary where by use of the method and system a working syringe may need to be calibrated for dual measurement.

The handle 23 of the master syringe 17 is then bottomed in the barrel 19 and subsequently drawn outwardly and pumped several times in order to be certain to eliminate all air or gas bubbles from the system. After this has been accomplished, liquid will be drawn into the barrel 19 by withdrawing the plunger 22 outwardly and setting the position of the handle 23 so that the free end of the rod 24 is in engagement with the flange 20. In this way a precisely measured amount of liquid will be drawn into the master syringe.

The plunger 31 of the working syringe then is bottomed in the barrel 25, the shut off valve is left open and the three-way valve 13 is readjusted by manipulation of the handle 16 so that the nipple 14 and consequently the barrel 19 is interconnected with the pipe 15 and then through the nipple 28 to the barrel 25. Adjustment of the three-way valve, as indicated, closes off the nipple 12 leading from the reservoir tank 10. The handle 23 of the master syringe 17 is then rotated until the rod 24 coincides with a clearance 56 in the flange 20, and the plunger is then pressed inwardly, expelling liquid from the barrel 19 through the nipple 14, pipe 15 and nipple 28 into the barrel 25. As the liquid is forced into the barrel 25, the plunger 31 will be displaced, moving downwardly under pressure of the incoming liquid. When the plunger 22 of the master syringe has been bottomed, the full calibrated amount of liquid will then be passed through the system so that a precisely corresponding amount of liquid will be present in the barrel of the working syringe. This, of course, displaces the plunger 31 by a precisely corresponding amount. After this has been accomplished, the jig 35 is fastened upon the plunger 31, virtually anywhere along its length, and the rod 33 is extended through its bore 40 until the upper end of the rod, as viewed in FIGURE 1, engages the flange 26. The screw 41 will then be manipulated to tighten the rod 33 in the selected position, the thumb screw 39 having previously been manipulated to fasten the jig to the plunger.

The working syringe can then, if desired, be removed from the nipple 28 after closing the shut-off valve 29, or if preferred, the plunger 31 can be rotated until the rod 33 overlies a clearance 57 and the calibrating liquid pumped out before removal. The jig 36 then accompanied by the plunger 31 and rod 33 is placed upon the stanchion 47 of the fixture which, for purposes of identification is given the reference character 58. With the parts in position as described and as shown in FIGURES 2 and 3, it is preferable to have the collar 32 on the plunger lifted slightly above the bottom of the mold cup 50. A mass 59 of synthetic plastic resin or epoxy is then poured into the mold cup, thereby potting the respective ends of the plunger 31 and rod 33 where it is permitted to harden to form an appropriate handle for the plunger 31 and its corresponding barrel 25. After hardening has taken place, the thumb screw 39 and tightening screw 41 are loosened as is also the tightening screw 46 and the jig 35 removed both from the plunger and rod, and the stanchion 47. The plunger is then ready for reinsertion into the working syringe barrel 25, thereby accurately calibrating the working syringe so that, when the selected rod setting is made use of, a precisely calibrated amount of fluid will be contained within the syringe.

On those occasions where the working syringe 18 may need two settings in order to draw into it successive amounts of calibrated liquid, the second rod 43 may be made use of. When this is to be accomplished, the rod 33 will be set with respect to the jig 35 in the same fashion as has already been described and as pictured in FIGURE 1. Thereupon, the three-way valve 13 will be reset so that it is shut off with respect to the nipple 14. The calibrating syringe 17 will then be removed, and a second calibrating syringe of the same general construction applied, the second syringe being set at, in all probability, a much smaller calibrated amount of liquid. Whatever the calibrated amount may be, it is drawn into the subsequent master syringe by applying the same process as was described in connection with the master syringe 17. This is, of course, accomplished by resetting the three-way valve 13, establishing passage from the reservoir tank 10 to the newly selected master syringe. After the syringe has been filled to the calibrated amount, the three-way valve 13 will then be reset to provide passage through the nipple 14 and pipe 15 from the newly selected master cylinder and the calibrating amount of liquid will be passed into the working syringe 18. This will move the plunger 31 still further outwardly a distance corresponding to the new amount of liquid. When in the new position, the second rod 43 will be slid into the bore 42 until it engages the flange 26, and the rod 43 will then be tightened into position by manipulation of the tightening screw 44. After this has been accomplished, the jig 35 will be removed, accompanied in this instance by the plunger 31 and both rods 33 and 43. Thereupon the jig will be applied to the stanchion 47 in the same manner as previously indicated and tightened upon the stanchion in the selected position by the tightening screw 46. Again, the same process will be pursued, namely filling the cup 50 with the appropriate synthetic plastic resin in order to anchor both rods 33 and 43 in position with respect to the plunger 31. As a consequence, the working syringe 18 will then be provided with a double calibrated effect so as to be capable of drawing initially one calibrated amount of liquid into the barrel 25 and thereafter be capable of drawing into the same barrel 25 a second calibrated amount of liquid, determined by the positioning of the rod 43. The proportion of the two amounts of liquid will always be precise and exact, determined as they have been initially by the calibrating method and system. Using the same general construction three rods instead of two may be set in the handle so that three separate quantities may be proportionately drawn into the device.

In the same manner, virtually any number of working syringes 18 can be calibrated in precisely the same fashion by use of the same master syringes. If preferred, the same method and system can be used to accurately quickly and effectively calibrate other working syringes to different calibrated amounts merely by making use of master syringes calibrated for those different amounts.

By use of the method and system, it will be clear that no real precise manipulation is needed inasmuch as all parts are simple, direct and positive and can be operated precisely by technicians of relatively modest skill.

While the invention has herein been shown and described in what is concieved to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A method of calibrating a proportioning syringe having a plunger and a setting rod thereon from a master syringe comprising placing a predetermined precise amount of liquid in said master syringe, passing said precise amount of liquid to said proportioning syringe and displacing the plunger thereof by a corresponding amount, temporarily securing said plunger to said setting rod at a location wherein said setting rod is in setting engagement with said proportioning syringe, then supporting said plunger and said setting rod in a fixed location and fastening a handle jointly to adjacent ends of said plunger and said setting rod to anchor them firmly together in calibrated relationship.

2. A method of calibrating a proportioning syringe having a plunger and a setting rod thereon from a master syringe comprising placing a predetermined precise amount of liquid in said master syringe, passing said precise amount of liquid to said proportioning syringe and displacing the plunger thereof by a corresponding amount, temporarily securing said plunger to said setting rod at a location wherein said setting rod is in setting engagement with said proportioning syringe, then supporting said plunger and said setting rod in a fixed location and molding a handle jointly around adjacent ends of said plunger and said setting rod to anchor them firmly together in calibrated relationship.

3. A method of calibrating a proportioning syringe having a plunger and a setting rod thereon from a master syringe by use of a temporary jig and molding assembly comprising placing a predetermined precise amount of liquid in said master syringe, passing said precise amount of liquid to said proportioning syringe and displacing the plunger thereof by a precisely corresponding amount, temporarily securing said plunger to said setting rod in respective positions in the jig wherein said setting rod is in setting engagement with said proportioning syringe, then supporting said jig with said plunger and said setting rod in a fixed location and molding a handle jointly around adjacent ends of said plunger and said setting rod to anchor them firmly together in calibrated relationship.

4. A method of calibrating a proportioning syringe having a plunger and setting rods thereon from master syringes by use of a temporary jig and molding assembly comprising placing a predetermined precise amount of liquid in one of said master syringes, passing said precise amount of liquid to said proportioning syringe and displacing the plunger thereof by a corresponding amount, temporarily securing said plunger and one of said setting rods in respective positions in the jig wherein said one setting rod is in setting engagement with said proportioning syringe, then placing a predetermined precise amount of liquid in another of said master syringes, passing said last identified precise amount of liquid to said proportioning syringe and displacing the plunger by a corresponding amount, temporarily securing another of said setting rods and said plunger in respective positions in the jig where said last identified setting rod is in setting engagement with said proportioning syringe, then supporting said jig with said plunger and said setting rods in a fixed location relative to said molding assembly and molding a handle jointly around adjacent ends of said plunger and said setting rods to anchor them firmly together in calibrated relationship.

5. A calibrating system for a proportioning syringe comprising a reservoir of liquid having an outlet passage at the bottom and valve means in said passage, said valve means having a first and a second liquid passage therefrom, a calibrating master syringe having a setting to receive a calibrating amount of liquid and adapted for attachment to said first liquid passage, said proportioning syringe having a plunger, a positioning rod for said plunger and a flanged barrel adapted to receive said plunger, said barrel having a releasable attachment to said second passage, a jig comprising a recess for reception of said plunger and releasable fastening means in said recess, an auxiliary recess for said positioning rod adjacent said first recess having a releasable fastening means therein and a stanchion recess having a releasable fastening means therein, said jig having a first temporary adjustable location releasably attached to said plunger and having said rod releasably attached in said auxiliary passage with one end in engagement with the flanged barrel when the proportioning syringe has been filled with a calibrating amount of liquid from said master syringe, a fixture comprising a base member and a stanchion on said base member, said base member having a mold cup therein larger in transverse dimension than the combined distance spanned by said plunger and said rod, said jig having a second temporary adjusted location attached to said stanchion and with the outer end of the plunger and the other end of said rod in said cup at a location above the bottom thereof, whereby said rod and said plunger are adapted to be anchored together by molding material poured into and hardened in said cup.

6. A calibrating system for a proportioning syringe comprising a reservoir of liquid having an outlet passage at the bottom and a two way valve in said passage, said valve having a first and a second liquid passage therefrom and a shut-off valve in said second liquid passage, said shut-off valve having a passage therefrom, a calibrating master syringe having a setting to receive a calibrating amount of liquid and adapted for attachment to said first liquid passage, said proportioning syringe having a plunger, a positioning rod for said plunger and a flanged barrel adapted to receive said plunger, said barrel having a releasable attachment to the passage from said shut-off valve, a jig comprising a recess for reception of said plunger and releasable fastening means in said recess, an auxiliary recess for said positioning rod adjacent said first recess having a releasable fastening means therein and a stanchion recess having a releasable fastening means therein, said jig having a first temporary adjustable location releasably attached to said plunger and having said rod releasably attached in said auxiliary passage with one end in engagement with the flanged barrel when the proportioning syringe has been filled with a calibrating amount of liquid from the master syringe, a fixture comprising a base member and a stanchion on said base member, a mold cup on said base member larger in transverse dimension than the combined distance spanned by said plunger and said rod, said jig having a second temporary adjusted location attached to said stanchion and with the outer end of the plunger and the other end of said rod in said cup at a location above the bottom thereof, whereby said rod and said plunger are adapted to be anchored together by molding material poured into and hardened in said cup.

References Cited by the Examiner

UNITED STATES PATENTS

| | | | |
|---|---|---|---|
| 2,607,343 | 8/1952 | Sarver | 128—218 |
| 3,146,620 | 9/1964 | Morril | 73—3 |

LOUIS R. PRINCE, *Primary Examiner.*